United States Patent
Lennen

(10) Patent No.: US 10,768,310 B2
(45) Date of Patent: Sep. 8, 2020

(54) SYSTEM AND METHOD FOR PROVIDING CODE MODIFICATION FOR MULTIPATH IMPROVEMENT IN GNSS RECEIVERS

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 253 days.

(21) Appl. No.: 15/938,400

(22) Filed: Mar. 28, 2018

(65) Prior Publication Data

US 2019/0204452 A1   Jul. 4, 2019

Related U.S. Application Data

(60) Provisional application No. 62/613,148, filed on Jan. 3, 2018.

(51) Int. Cl.
  *G01S 19/22*    (2010.01)
  *G01S 19/30*    (2010.01)

(52) U.S. Cl.
  CPC ............. *G01S 19/22* (2013.01); *G01S 19/30* (2013.01)

(58) Field of Classification Search
  CPC .......... G01S 19/22; G01S 19/30; G01S 19/18; G01S 19/29; G01S 13/003
  USPC .................................................. 342/357.61
  See application file for complete search history.

(56) References Cited

U.S. PATENT DOCUMENTS

| | | |
|---|---|---|
| 5,917,866 A | 6/1999 | Pon |
| 6,031,884 A | 2/2000 | Pon |
| 6,130,908 A * | 10/2000 | Pon .......................... G01S 19/22 |
| | | 342/357.61 |
| 6,160,841 A | 12/2000 | Stansell, Jr. et al. |
| 6,243,409 B1 | 6/2001 | Fenton et al. |
| 6,414,987 B1 | 7/2002 | Pon |
| 7,142,589 B2 | 11/2006 | Valio |

(Continued)

FOREIGN PATENT DOCUMENTS

| CA | 2 617 216 | 2/2007 |
|---|---|---|
| EP | 1 271 102 | 1/2003 |

OTHER PUBLICATIONS

Macchi-Gernot, Florence et al., Combined Acquisition and Tracking Methods for GPS L1 C/A and L1C Signals, International Journal of Navigation and Observation, vol. 2010, Article ID 190465, 19 pages.

(Continued)

*Primary Examiner* — Harry K Liu
(74) *Attorney, Agent, or Firm* — The Farrell Law Firm, P.C.

(57) ABSTRACT

Systems, methods and apparatuses for multipath mitigation in global navigation satellite system (GNSS) receivers are described. One method includes modifying the locally generated code in the GNSS receiver bit by bit in order to reduce offset peaks in the autocorrelation when receiving the satellite generated code signal. Such modified local codes may be pre-computed and stored or otherwise provided during reception. Moreover, the GNSS receiver may select whether or not to use the modified local code or the standard local code based on a selection criteria. Furthermore, multiple modified version of the same local code may be generated and/or stored in order to provide differing performance levels.

20 Claims, 10 Drawing Sheets

(56) References Cited

U.S. PATENT DOCUMENTS

| | | | |
|---|---|---|---|
| 7,852,908 B1* | 12/2010 | Norman | G01S 19/21 375/150 |
| 8,170,085 B2 | 5/2012 | Han | |
| 8,305,268 B2 | 11/2012 | Lennen | |
| 9,291,717 B2 | 3/2016 | Lennen | |
| 9,385,767 B2 | 7/2016 | Veitsel et al. | |
| 9,482,760 B2 | 11/2016 | Lennen | |
| 9,784,845 B2 | 10/2017 | Lennon | |
| 2004/0071197 A1 | 4/2004 | Lin | |
| 2007/0058696 A1 | 3/2007 | Dempster et al. | |
| 2009/0268788 A1* | 10/2009 | Simic | G01S 19/21 375/150 |

OTHER PUBLICATIONS

Petovello, Mark, GNSS Solutions: Multipath vs. NLOS signals, How Does Non-Line-of-Sight Reception Differ from Multipath Interference, Inside GNSS, Nov./Dec. 2013, pp. 40-44.

Indian Space Research Organization, Indian Regional Navigation Satellite System, Signal in Space ICD for Standard Positioning Service, Version 1.1, Aug. 2017, 72 pages.

European GNSS (Galileo) open service, Signal in space Interface Control Document, European Union 2016, version 1.3, Dec. 2016, 88 pages.

Global positioning systems directorate systems engineering & integration—Interface specification IS-GPS-800D, Navstar GPS Space Segment/User Segment L1C Interface, Sep. 24, 2013, 127 pages.

Global Navigation Sattelite System, Glonass, Interface Control Document, Navigational radiosignal in bands L1, L2, (Edition 5.1) Moscow 2008, 65 pages.

BeiDou navigation satellite system—Signal in space interface control document, Open service signal B1I, China Satellite Navigation Office, version 1.0, Dec. 2012, 81 pages.

Bhuiyan, Mohammad Zahidul H. et al.,Multipath Mitigation Techniques for Satellite-Based Positioning Applications, Global Navigation Satellite Systems: Signal, Theory and Applications, Chapter 17, InTech, pp. 405-426.

The Cabinet Office, Government of Japan ("CAO") and Quasi-Zenith Satellite Systems Services Inc., Quasi-Zenith Satellite System Interface Specification Satellite Positioning, Navigation and Timing Service, Mar. 28, 2017, 148 pages.

Global positioning systems directorate systems engineering & integration—Interface Specification IS-GPS-200H, Navstar GPS Space Segment/Navigation User Interfaces, Sep. 24, 2013, 226 pages.

Ward, Phillip W., Satellite signal acquisition, tracking, and data demodulation, chapter 5, Understanding GPS principles and applications (2nd Ed., 2005), pp. 153-241.

Glennon, Eamonn P. et al., Cross Correlation Mitigation Techniques for Software GPS C/A Code Receivers, International Global Navigation Satellite Systems Society, IGNSS Symposium 2007, Dec. 4-6, 2007, 15 pages.

* cited by examiner

US 10,768,310 B2

SYSTEM AND METHOD FOR PROVIDING CODE MODIFICATION FOR MULTIPATH IMPROVEMENT IN GNSS RECEIVERS

PRIORITY

This application claims priority under 35 U.S.C. § 119(e) to U.S. Provisional Patent Application Ser. No. 62/613,148 filed on Jan. 3, 2018, the entire disclosure of which is incorporated herein by reference.

FIELD

The present disclosure relates generally to navigation systems, and more particularly, to providing a system and method for providing code modification for multipath mitigation in global navigation satellite system (GNSS) receivers.

BACKGROUND

Satellite navigational systems provide positional and timing information to earth-bound receivers, sometimes referred to as position, velocity, and timing (PVT) and/or position, navigation, and timing (PNT) measurements. Each system has its own constellation of satellites orbiting the Earth, and, in order to calculate its position, a receiver on Earth uses the satellites "in view" (i.e., in the sky above) from that system's constellation. A global navigational satellite system (GNSS) is often used as the generic terra for such a system, even though such navigational satellite systems include regional and augmented systems—i.e., systems that are not truly "global," The term "GNSS," as used herein, covers any type of navigational satellite system, global, regional, augmented or otherwise, unless expressly indicated otherwise.

SUMMARY

According to one aspect of the present disclosure, a method is provided for a global navigation satellite system (GNSS) receiver, including modifying one or more bits of a locally generated code used according to a threshold criteria for autocorrelation offset peaks and correlating a corresponding satellite generated code in a received GNSS signal using the modified locally generated code.

According to another aspect of the present disclosure, a global navigation satellite system (GNSS) receiver is provided, including a plurality of satellite code signal generators which are capable of generating modified local code, wherein the generated modified local code is a locally generated code with one or more bits modified according to a threshold criteria for autocorrelation offset peaks; and a plurality of correlators which receive the generated modified local code and use the generated modified local code to correlate a corresponding satellite generated code in a received GNSS signal.

According to still another aspect of the present disclosure, an apparatus is provided, which includes one or more non-transitory computer-readable media; and at least one processor which, when executing instructions stored on one or more non-transitory computer readable media, performs the steps of modifying one or more bits of a locally generated code used according to a threshold criteria for autocorrelation offset peaks and correlating a corresponding satellite generated code in a received GNSS signal using the modified locally generated code.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
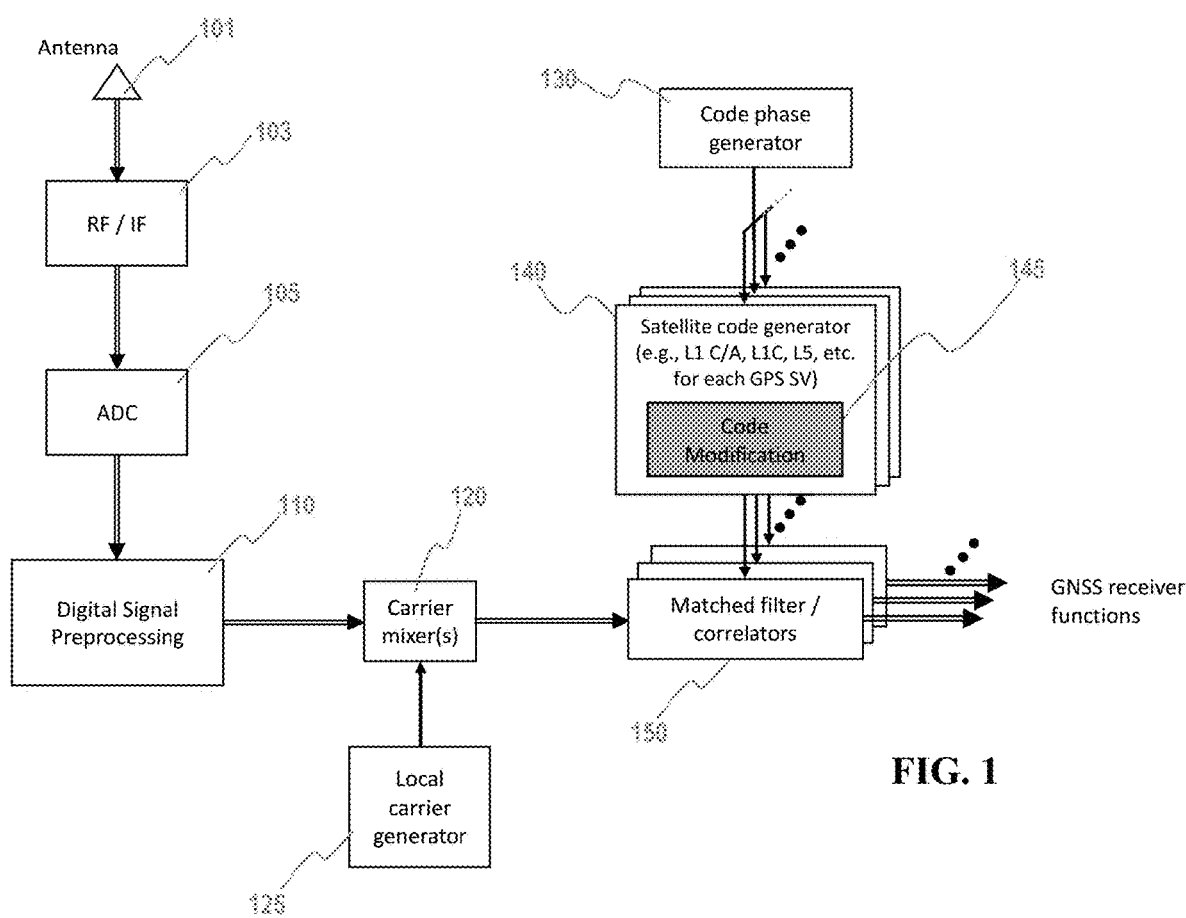
FIG. 1 illustrates an exemplary block diagram of the present GNSS receiver, according to an embodiment.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope of the present disclosure in addition, descriptions of well-known functions and constructions are omitted for clarity and conciseness.

Hereinafter, embodiments of the present disclosure are described in detail with reference to the accompanying drawings. It should be noted that the same elements are designated by the same reference numerals although they are shown in different drawings. hi the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, hut includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise, in the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

The number of GNSS systems, both planned and presently operational, is growing. These include the widely-known, widely-used, and truly global global positioning system (GPS) of the United States, Russia's GLObalnaya NAvigatsionnaya Sputnikovaya Sistema (GLONASS), Europe's Galileo system, and China's BeiDou systems—each of which has, or will have, its own constellation of satellites orbiting the entire globe. Regional systems (those that are not global, but intended to cover only a certain region of the globe) include Japan's Quasi-zenith satellite system (QZSS) and the Indian regional navigational satellite system (IRNSS) also currently being developed. Satellite-based augmentation systems (SBASs), which are normally regional as well, "augment" existing GNSS systems with, e.g., messages from ground-based stations and/or additional navigational aids, are also continually developing and expanding.

On the receiving side, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. Moreover, multi-constellation GNSS receivers are being developed which receive signals from more than one satellite constellation (e.g., two or more of GPS, Galileo, GLONASS, Beidou, regional systems, and/or augmentation system constellations) and provide much greater accuracy because the number of unblocked satellites, sometimes referred to as satellite/space vehicles (SVs), overhead at any time from several constellations is always greater than the number of SVs overhead from a single constellation.

The term "GNSS receiver" as used herein, covers any such implementation of GNSS capabilities in a device or system.

Multipath mitigation describes methods that try to compensate for or cancel the effects of non-line of sight (NLOS) signals received by a GNSS receiver. Herein, "multipath mitigation" is sometimes used loosely to cover the mitigation of both the effects of multipath propagation, where the GNSS receiver receives both the "true" line of sight (LOS) signal and reflected NLOS signals (following different paths, i.e., multipath) from a satellite/SV, and the effects when the GNSS receiver receives only the NLOS signal(s) of a satellite, but not the actual LOS signal, which is commonplace in urban environments where the sides of "canyons" formed by tall buildings cause many NLOS signals from satellite that are not in direct view. See, e.g., Petrovello, M., *Multipath vs. NLOS signals: How does non-line-of-sight reception differ from multipath interference?* Inside GNSS, November-December 2013, pp. 40-44, which is incorporated by reference herein in its entirety.

Multipath/NLOS signals may significantly reduce the performance of GNSS receivers. See, e.g., Bhuiyan et al., *Multipath mitigation techniques for satellite-based positioning applications*, chapter 17, pp. 405-426, Global navigation satellite systems: signal, theory and applications, In: Jin, S., ed. (InTech: Rijeka, Croatia, 2012) (hereinafter referred to as "GNSSs: signal, theory and applications, chap. 17"), which is incorporated by reference herein in its entirety.

The present disclosure is related to mitigating the impact of range/range rate errors in GNSS receivers caused by multipath/NLOS signals.

Accordingly, an aspect of the present disclosure provides quick and efficient methods and apparatuses for code modification for multipath mitigation in GNSS receivers.

Embodiments of the present disclosure provide systems, methods, and apparatuses which use autocorrelation to modify bits in individual satellite signal codes for multipath mitigation. These are independent processes, where the code modifications are per code (per satellite), thereby adjusting for multipath issues in real-time for individual satellites in actual complex signal environments, such as urban canyons.

By modifying multiple chips per single satellite code, multipath performance is improved by reducing the energy in the immediate vicinity of early side (false) correlations, before the main peak (true) correlation, for that single satellite code.

Since embodiments of the present disclosure utilize autocorrelation properties, embodiments of the present disclosure work based on only a single satellite code signal, whether that signal be strong or weak. Embodiments of the present disclosure optimize one code per a single satellite by changing multiple code chips within one satellite code, not across multiple satellites and not across different satellite frequencies. However, embodiments of the present disclosure may be applied to multiple satellites, codes, and frequencies by simultaneously applying the code modification algorithm per each individual satellite code.

Embodiments of the present disclosure improve the probability of multipath detection in general, and also reduce the probabilities of false alarms and increases the accuracy of detection statistics over time. In particular, embodiments of the present disclosure improve multipath detection of early arriving signals, which may be especially important for GNSS signals such as the GPS L5 signal.

Moreover, in comparison with conventional multipath mitigation techniques which require modified codes per code phase offsets and carrier phase offsets, the one satellite code modified pursuant to embodiments of the present disclosure provides improved properties across all code phases and carrier frequency phase offsets, as is shown in detail below.

Although most of the description below is of embodiments concerning GPS L1 C/A and GPS L5 signals, the present disclosure is not limited thereto, and multiple other embodiments are possible, some of which are mentioned herein, including, for example, application to the GPS L1 C signal codes, the Galileo E1 signal codes, and/or the QZSS L1C signal codes. For more detailed descriptions of some, but not all, GNSS signals, including regional systems, to which embodiments of the present disclosure are applicable, see, e.g., Global positioning systems directorate systems engineering & integration—Interface specification IS-GPS-200H (Sep. 24, 2013), describing the GPS L1 C/A, L2C, and P channel/codes (hereinafter referred to generally as "IS-GPS-200"); Global positioning systems directorate systems engineering & integration-Interface specification IS-GPS-800D (Sep. 24, 2013), describing the GPS L1C channel/code (hereinafter referred to generally as "IS-GPS-800"); Global navigation satellite system-GLONASS-Interface control document-Navigational radio signal in bands L1, L2 (Edition 5.1) (2008) (hereinafter referred to generally as "GLONASS L1,L2 ICD"); European GNSS (Galileo) open service-Signal in space interface control document (version 1.3) (2016) (hereinafter referred to generally as "Galileo OS-SIS-ICD"); BeiDou navigation satellite system-Signal in space interface control document-Open service signal B1I (version 1.0) (December 2012) (hereinafter referred to generally as "BeiDou ICD"); Quasi-zenith satellite system-Interface specification-Satellite positioning, navigation and timing service (hereinafter referred to generally as "IS-QZSS-PNT-001"); and Indian regional navigation satellite system-Signal in space ICD for standard positioning service (version 1.1) (hereinafter referred to generally as "ISRO-IRNSS-ICD-SPS-1.1"), all of which are incorporated herein by reference in their entirety.

Moreover, embodiments of the present disclosure are equally applicable to GNSSs assisted or augmented by SBASs, such as wide area augmentation system (WAAS), European geostationary navigation overlay service (EGNOS), multi-functional satellite augmentation system (MSAS), GPS aided gee augmented navigation (LAGAN), and the "assisted" GNSS (A-GNSS) technology being developed for, e.g., measurement/testing of signals in cellular telecommunication systems (see $3^{rd}$ generation partnership project (3GPP) technical specification 3GPP TS 37.571: Universal terrestrial radio access (UTRA) and evolved UTRA (E-UTRA) and evolved packet core (EPC); user equipment (UE) conformance specification for UE positioning, which has five parts, all of which are incorporated herein by reference).

The documents/standards defining the various GNSS signals and/or augmented, regional or global systems, such as, for example, IS-GPS-800 (describing the GPS L1C channel/code), IS-GPS-200 (describing the GPS L1-C/A, L2C, and P channels/codes), GLONASS L1,L2 ICD, GALILEO OS-SIS-ICD, BEIDOU ICD, and IS-QZSS-PNT-001, and ISRO-IRNSS-ICD-SPS-1.1, which are all mentioned and incorporated above, may be collectively referred to herein as "interface control documents" or "ICDs."

Accordingly, one of ordinary skill in the art would recognize the applicability of the present disclosure to a variety of signals from any global or regional GNSS, whether augmented/assisted or not. Moreover, and as also would be understood by one of ordinary skill in the art, "channels," "bands," and "codes" may sometimes be used herein interchangeably, as many GNSS signals are transmitted on the same channel (i.e., same frequency, same time) or band (i.e., frequency bandwidth), but with different codes, which effectively makes them different "channels," in the more general sense of the term.

FIG. 1 illustrates an exemplary block diagram of the present GNSS receiver, according to an embodiment. Only components of the receive chain of a GNSS receiver pertinent to embodiments of the present disclosure are shown/ discussed herein. For more details regarding components in a GNSS receive chain, see, e.g., Ward et al., *Satellite signal acquisition, tracking, and data demodulation*, chapter 5, Understanding GPS principles and applications (2$^{nd}$ Ed., 2005), Kaplan and Hegarty, eds. (Artech House); Macchi-Gernot et al., *Combined acquisition and tracking methods of GPS L1 C/A and L1C Signals*, Int'l journal of navigation and observation, vol. 2010, article id. 190465, 19 pages (hereinafter, "Macchi-Gernot 2010"); IS-GPS-200; IS-GPS-800; and U.S. Pat. Nos. 9,482,760; 9,291,717; 8,305,268; and 9,784,845, all by the present inventor; all of which are incorporated by reference in their entirety.

In FIG. 1, the GNSS signals received by antenna 101 are processed by radio frequency (RF)/intermediate frequency (IF) block 103, that amplifies, filters, and outputs a complex IF analog signal. The double tines connecting the boxes in FIG. 1 represent the fact that the signals being processed are complex, i.e., having both an in-phase (I) and quadrature (Q) components. The analog-to-digital converter (ADC) 105 receives the IF analog signal output by RF/IF block 101 and converts it into a digital signal for further processing in the digital domain by digital signal preprocessing block 110. Among other functions, digital signal preprocessing block 110 detects and removes interfering signals and, in a multi-GABS embodiment, would separate the GNSS signals into their individual systems. For example, GPS signals would be separated from the GLONASS signals.

The signals output from digital signal preprocessing block 110 are input into carrier mixer 120, which translates the input signals to baseband signals by mixing the input signals with signals output from local carrier frequency generator 125, which may be, for example, a numerically-controlled oscillator (NCO) with a look-up table (LUT). As would be understood by one of ordinary skill in the art, signal tracking procedures (typically implemented in software) may form a carrier frequency tracking discriminator from the correlations later in the receive chain and apply a loop filter to provide feedback to the local carrier frequency generator 125.

The baseband signals output from carrier mixer 120 are input into matched filter/correlators 150, which correlate the baseband signals with individual satellite codes, thereby outputting sets of correlated signals for each satellite signal, which, as indicated in FIG. 1, are used for GNSS receiver functions.

The individual satellite codes used for correlation are fed from code generator(s) 140, which, using GPS as an example, generates L1 C/A, L1C, L5, etc., signal codes for each of the 37 GPS satellites, in order that each of the matched filter(s)/correlator(s) 150 will attempt to correlate with those GPS signals. Satellite code generator(s) 140 is driven by code phase generator 130. Similar to the carrier frequency tracking discussed in reference to (local) carrier mixer 120 and local carrier frequency generator 125 above, and as would be understood by one of ordinary skill in the art, code correlating/tracking procedures (typically implemented in software) form a code tracking discriminator function that is further filtered to generate a feedback code phase shift estimate to code phase generator 130.

According to embodiments, code modification 145 is provided per satellite code and may take many possible forms in hardware and/or software, as would be understood by one of ordinary skill in the art. For example, implementations of code modification 145 includes, but is not limited to:

Use of memory code injection into correlation process of precomputed modified codes;

Real-time switching of various local modified codes based on receiver mode (such as wide uncertainty acquisition vs. narrow range tracking) and performance requirements;

Using different modified codes based on type of correlation, e.g., standard (ICD defined), high performance (a low $C/N_0$ loss variant), and low performance (higher $C/N_0$ loss variant, e.g. 1 dB loss);

Using different modified codes based on the minimization of autocorrelation offset by changing more chips (e.g., 10 chips vs. only 4 chips); and Keeping lookup tables (LUTs) of values to flip (per chip/bit position) and flipping only the minimum required chip/bits in standard code generation.

Moreover, in embodiments where storage of precomputed modified codes may be impractical, such as for the GPS P(Y) or M codes, computation of modified codes may be hard-wired, performed in software, or some combination of both.

Specific examples of multipath reception are discussed and explained in detail below, using different GPS L1 C/A code signals. The GPS L1 C/A codes are documented in the various GPS Interface Control Documents, including the previously cited and incorporated IS-GPS-200. 37 C/A pseudorandom (PRN) codes are defined, one per satellite, where each C/A PRN code includes a unique 1023-bit binary sequence. Each C/A PRN code is replicated by the satellite code generator(s) 140 of a GPS receiver in order to correlate/demodulate (i.e., "separate out") each satellite code from the received signal.

In the GNSS receiver, each PRN code correlation includes a main peak for the LOS received signal (if any) and a number of side peaks for each of the NLOS signals. The stronger the NLOS side peaks, the more likely the true LOS main peak will not be correctly identified. Unless the true LOS main peak is correctly identified, the calculated PVT/PNT measurements will be inaccurate since they are based on essentially false signals. As discussed in U.S. Prov. Pat. App. Ser. No. 62/613,148, from which this regular utility patent application claims priority and which is incorporated herein by reference in its entirety, the GLONASS C/A codes have excellent built-in autocorrelation properties which provide substantial multipath mitigation. This is not true of, for example, GPS C/A codes.

Figure 2A:
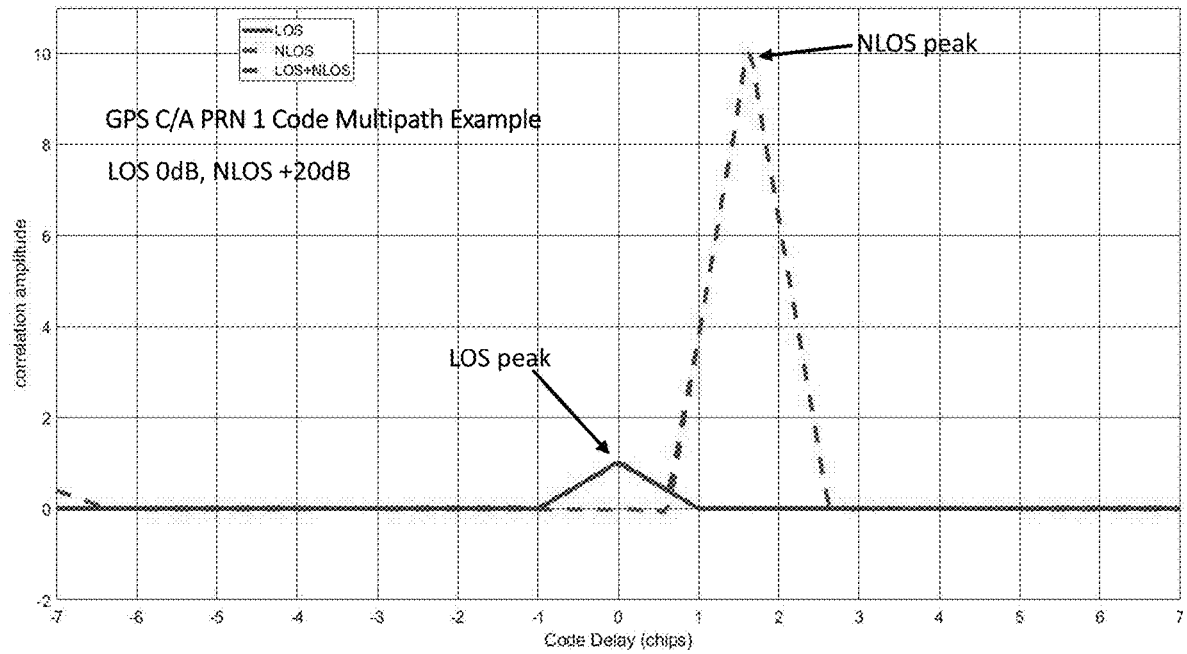
FIG. 2A illustrates an exemplary plot of correlation amplitude/code delay for illustrating both the LOS signal and an NLOS signal received by a GNSS receiver from the GPS (pseudorandom) PRN 1 C/A code signal, according to an embodiment.

FIG. 2A illustrates an exemplary plot of correlation amplitude/code delay for illustrating both the LOS signal and an NLOS signal received by a GNSS receiver from the GPS (pseudorandom) PRN 1 C/A code signal, according to an embodiment. As shown in FIG. 2A, the NLOS peak is offset in time (i.e., in code delay, which is also ultimately equivalent to distance measurement, or mis-measurement, as the case may be) but is 20 dB stronger than the LOS main peak. When received and correlated, the NLOS signal and LOS signal are added together, so the amplitude of the NLOS signal peak is actually a combination of the LOS signal at that code delay (which should have a zero amplitude) and the NLOS signal.

Figure 2B:
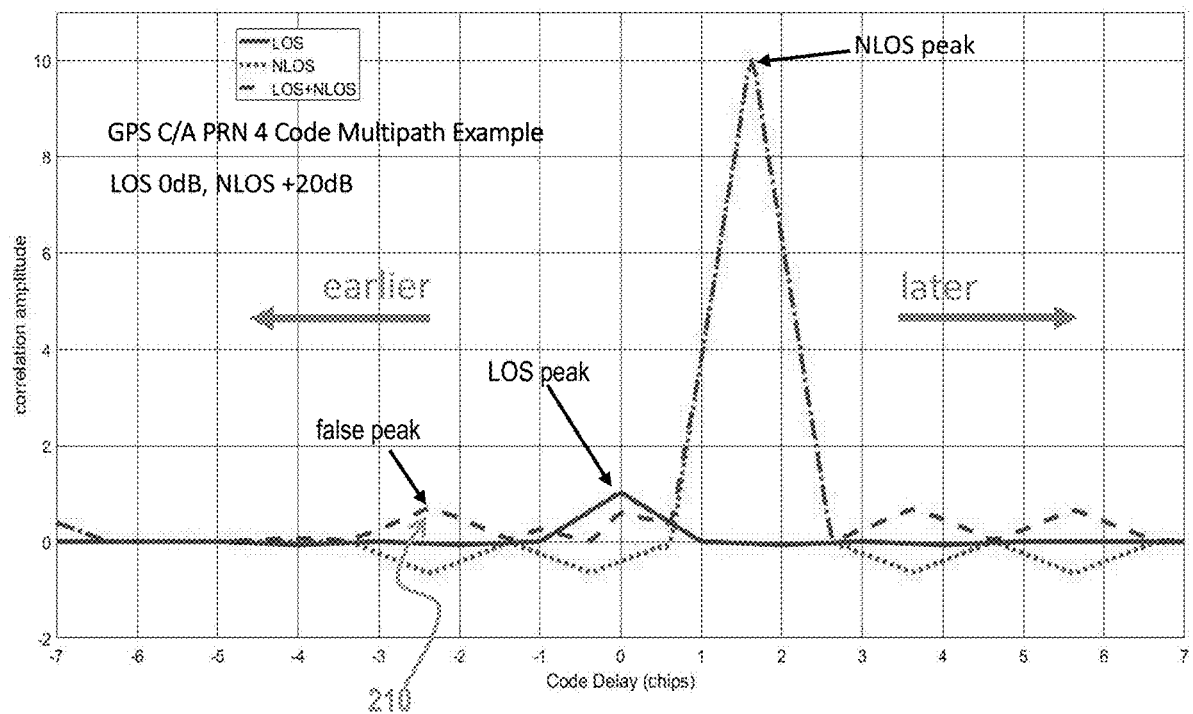
FIG. 2B illustrates an exemplary plot of correlation amplitude/code delay for illustrating both the LOS signal and an NLOS signal received by a GNSS receiver from the GPS PRN 4 C/A code signal, according to an embodiment.

FIG. 2B illustrates an exemplary plot of correlation amplitude/code delay for illustrating both the LOS signal and an NLOS signal received by a GNSS receiver from the CMS (pseudorandom) PRN 1 C/A code signal, according to an embodiment. The dashed line shows the LOS+NLOS combination, the dotted line shows the NLOS signal alone, while the solid line shows the LOS signal alone for zero degree carrier phase offsets between the LOS and the NLOS. Other carrier phase offsets will produce a more complicated relationship than the simple addition shown here, as would be understood by one of ordinary skill in the art. For example, a 180 degree phase offset would cause the LOS to be subtracted from the NLOS instead of added. Carrier phase offsets other than zero degrees does not impact the efficacy of embodiments of the present disclosure. As shown in FIG. 2B, C/A PRN 4 has significant correlation side peaks near the LOS true peak, and one of the NLOS side peaks interferes with the LOS peak and creates a LOS+NLOS peak 700 meters earlier around a code delay of about −2½ chips at 210. This could lead to significant PVT/PNT measurement errors if used to compute the GNSS receiver position. The earliest arriving signals are the most desirable as they are most likely to be LOS (except, of course, if they are auto-correlations from the strong NLOS signal).

Specific examples of the autocorrelation properties of GPS L1 C/A code signals are discussed in reference to FIGS. 3A-3D below. Each GPS C/A code has its own unique or "signature" characteristics with regards to the time delay offset of the autocorrelation side peaks. For each GPS C/A code, the chip width is approximately 293 meters, and +/−1 chip offsets often have non-zero values.

Figure 3A:
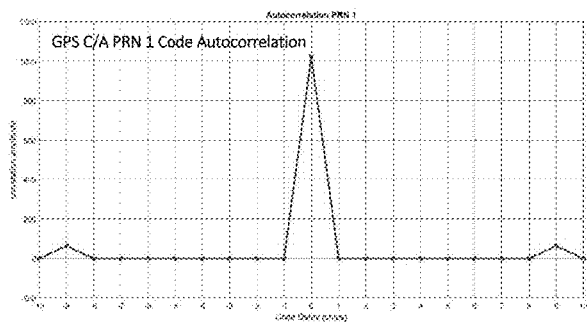
FIG. 3A illustrates an exemplary plot of correlation amplitude/code delay illustrating the autocorrelation of the GPS PRN 1 C/A code signal, according to an embodiment.

FIG. 3A illustrates an exemplary plot of correlation amplitude/code delay illustrating the autocorrelation of the GPS PRN 1 C/A code signal, according to an embodiment. However, the autocorrelation signal characteristics of the C/A PRN 1 code signal are such that modification is not required, as there are no non-zero values within a +/−8 chip delay.

Figure 3B:
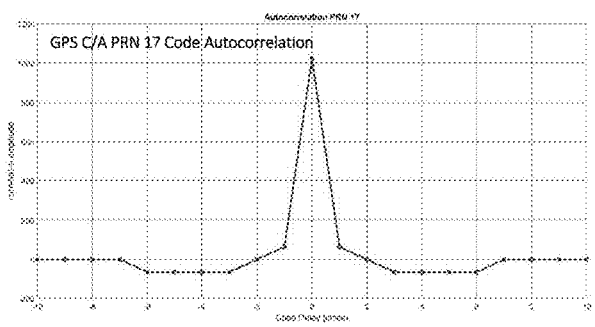
FIG. 3B illustrates an exemplary plot of correlation amplitude/code delay illustrating the autocorrelation of the GPS PRN 17 C/A code signal, according to an embodiment.

FIG. 3B illustrates an exemplary plot of correlation amplitude/code delay illustrating the autocorrelation of the GPS PRN 17 C/A code signal, according to an embodiment. Unlike the GPS C/A PRN 1 code autocorrelation in FIG. 3A, the autocorrelation signal characteristics of the C/A PRN 17 code signal are such that modification is likely required, as there are multiple non-zero values within a +/−7 chip delay.

Figure 3C:
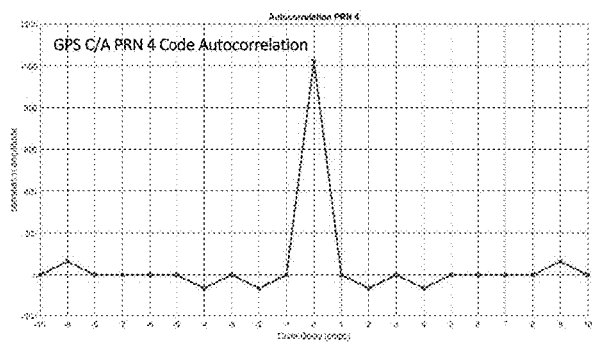
FIG. 3C illustrates an exemplary plot of correlation amplitude/code delay illustrating the autocorrelation of the GPS PRN 4 C/A code signal, according to an embodiment.

FIG. 3C illustrates an exemplary plot of correlation amplitude/code delay illustrating the autocorrelation of the GPS PRN 4 C/A code signal, according to an embodiment. Unlike the GPS C/A PRN 1 code autocorrelation in FIG. 3A, the autocorrelation signal characteristics of the C/A PRN 4 code signal are such that modification is likely required, as there are multiple non-zero values within a +/−5 chip delay.

Figure 3D:
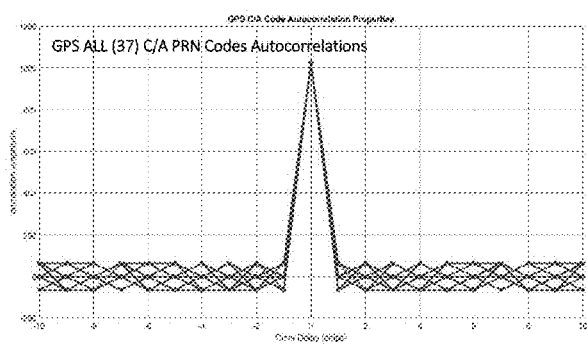
FIG. 3D illustrates an exemplary plot of correlation amplitude/code delay illustrating the autocorrelations of all of the 37 GPS PRN C/A code signals, according to an embodiment.

FIG. 3D illustrates an exemplary plot of correlation amplitude/code delay illustrating the autocorrelations of all of the 37 GPS PRN C/A code signals, according to an embodiment. This further shows that the +/−1 chip offsets often have non-zero values, as stated above.

The correlation amplitude for autocorrelation is 1023 when it is the aligned peak, and −65, +63, or −1 when it is a non-aligned peak. The energy of a −65 non-aligned autocorrelation peak is −23.9 dB with respect to the correctly aligned autocorrelation peak; the energy of a +63 non-aligned autocorrelation peak is −24.2 dB with respect to the correctly aligned autocorrelation peak; and the energy of a −1 non-aligned autocorrelation peak is −60.2 dB with respect to the correctly aligned autocorrelation peak.

Ideally, the autocorrelation side peak on the early side of the main peak should be zero in order to prevent autocorrelation side peak interference. Because multipath signals in urban canyon environments are generally limited to within a kilometer of the actual location and the non-zero peak values are generally located at integer chip delays, having the autocorrelation amplitude be relatively close to zero at −4, −3, −2, and −1 chip delay will greatly reduce side peak interference (−4 chip delay≈−1.2 km). Although there is autocorrelation between integers as well, when the peak integer value is minimized, the non-integer autocorrelation is also minimized.

Therefore, one goal of the present disclosure is to modify the GPS C/A code bits such that the offset correlations observed earlier than the true autocorrelation peak are close to zero, and particularly that the values at −4, −3, −2, and −1 chip delays be close to zero. In general, it is also desirable to minimize offset autocorrelation within an approximately 3 chip offset (≈879 meters) of the true autocorrelation peak. Moreover, it is particularly desirable to reduce the non-aligned −65 and +63 amplitude peaks when mitigating multipath autocorrelation interference. Accordingly, these are also among the goals of the present disclosure.

An example of a code modification algorithm according to an embodiment is discussed in reference to FIG. 4 below.

In this embodiment, the algorithm starts with the ICD version of a particular GPS L1 C/A, code ("code"), modifies the code pursuant to the algorithm, and then stores the modified version of the code ("mcode") for each particular satellite. In this embodiment, all 37 modified codes are pre-computed and stored in the GNSS receiver.

The algorithm flips a bit in the code in order to minimize any side peaks (in amplitude/magnitude), but the operation is conditional and iterative—i.e., once a bit is flipped, if the sidelobe suppression goal is not met, the operation moves on to the next bit in the code.

Figure 4:
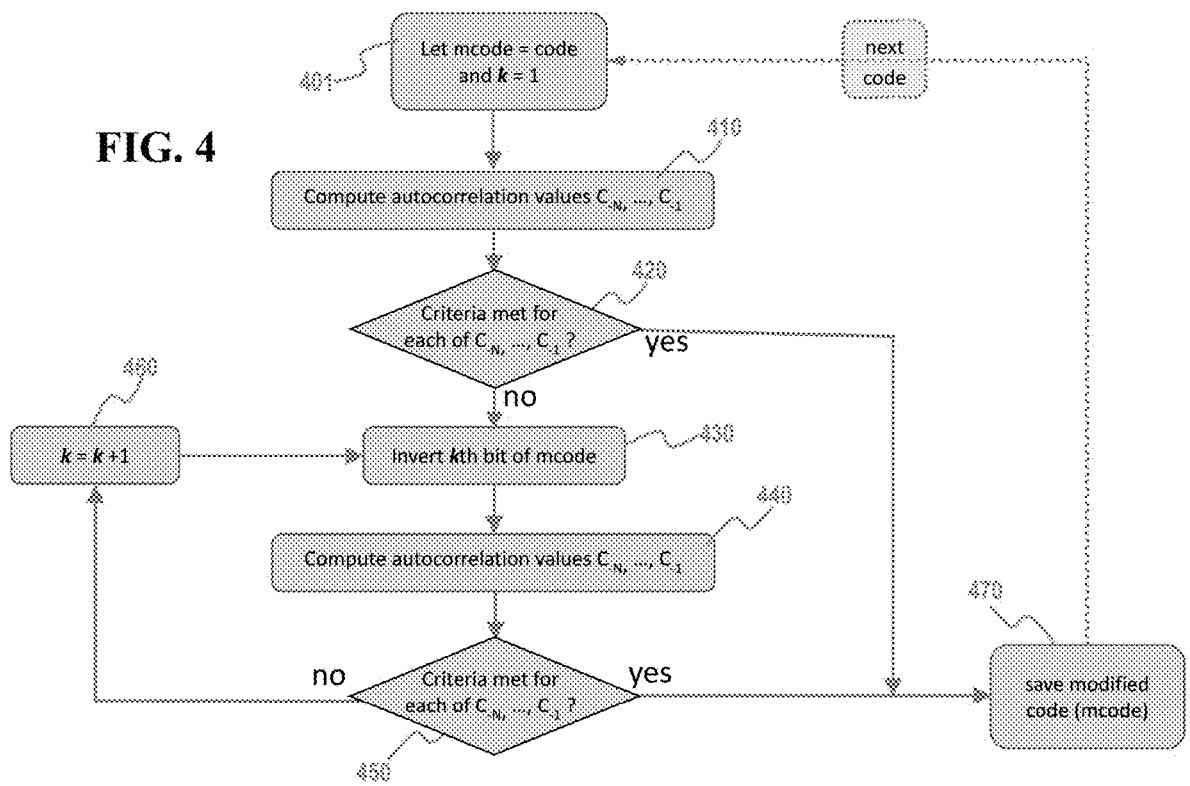
FIG. 4 illustrates an exemplary flowchart of a method for multipath mitigation by modifying satellite codes using autocorrelation, according to an embodiment.

FIG. 4 illustrates an exemplary flowchart of a method for multipath mitigation by modifying satellite codes using autocorrelation, according to an embodiment. The autocorrelation function is given as Equation (1) below:

$$C_{i=-511,\ldots,+511} = \Sigma_{n=1,\ldots,1023}(B_n \otimes A_{n-i}) \quad (1)$$

where $C_i$ is the resulting correlation sum for the ith code delay offset (i=0 is the time aligned correlation), $B_n$ is the nth bit of the 1023 bit incoming satellite C/A code, $A_{n-i}$ is the nth bit of the locally generated 1023 bit C/A code, and n=1, . . . , 1023 is the code bit index.

Ideally, the time-aligned autocorrelation is $C_0$=+1023 because, for the time-aligned code, the transmitted and locally-generated code bits always match, i.e., $B_n$=+1 and $A_{n-i}$=+1 or $B_n$=−1 and $A_{n-i}$=−1, while every $C_i$ besides $C_0$ should be zero. In reality, as discussed above, there are offset/non-aligned autocorrelations for which $C_i$=−65, +63 or −1.

In an embodiment, one goal is to reduce the offset autocorrelation peaks to as close to zero as possible, while maintaining the time aligned autocorrelation peaks. In the embodiment shown in FIG. 4, the goal is to reduce any offset peaks for early autocorrelations $C_{-N}$ to $C_{-1}$ to as close to zero as possible while maintaining $C_0$ close to +1023.

At 401, the present system sets a GPS L1 C/A code ("code") to be modified ("mcode") and the bit index k to one (k=1). At 410, the present system calculates offset autocorrelation values for $C_{-N}$ to $C_{-1}$. At 420, the present system determines whether all of the offset autocorrelation values for $C_{-N}$ to $C_{-1}$ meet the required criteria, which may be, e.g., less than an amplitude of 10. If all of the offset autocorrelation values for $C_{-N}$ to $C_{-1}$ meet the required criteria at 420, the present system saves the mcode at 470, and the process continues with the next GPS C/A code at 401.

If all of the offset autocorrelation values for $C_{-N}$ to $C_{-1}$ do not meet the required criteria at 420, the present system inverts/flips the kth bit of the mcode at 430. Flipping a bit causes any non-zero autocorrelation value to change by +2 or −2, including the main/true autocorrelation peak (which ideally should remain +1023). At 440, the present system calculates again the offset autocorrelation values for $C_{-N}$ to $C_{-1}$. At 450, the present system determines again whether all of the offset autocorrelation values for $C_{-N}$ to $C_{-1}$ meet the required criteria.

If all of the offset autocorrelation values for $C_{-N}$ to $C_{-1}$ meet the required criteria at 450, the present system saves the mcode at 470, and the process continues with the next GPS C/A code at 410. If all of the offset autocorrelation values for $C_{-N}$ to $C_{-1}$ do not meet the required criteria at 450, the present system increments k to k+1 at 460 and the process loops back to 430, where the new kth bit of the mcode is inverted/flipped. The process continues looping until the criteria are met and the present system saves the mcode at 470. Simulations show that if N is kept to a low value, the mode will meet the required criteria before the method runs out of bits to flip.

Figure 5A:
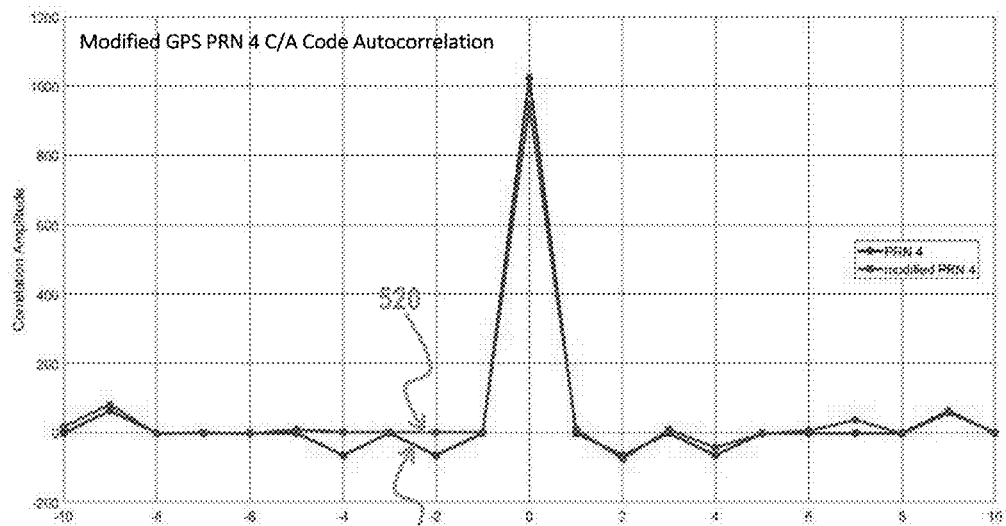
FIG. 5A illustrates an exemplary plot of correlation amplitude code delay illustrating a received modified GPS PRN 4 C/A code signal, according to an embodiment.
Figure 5B:
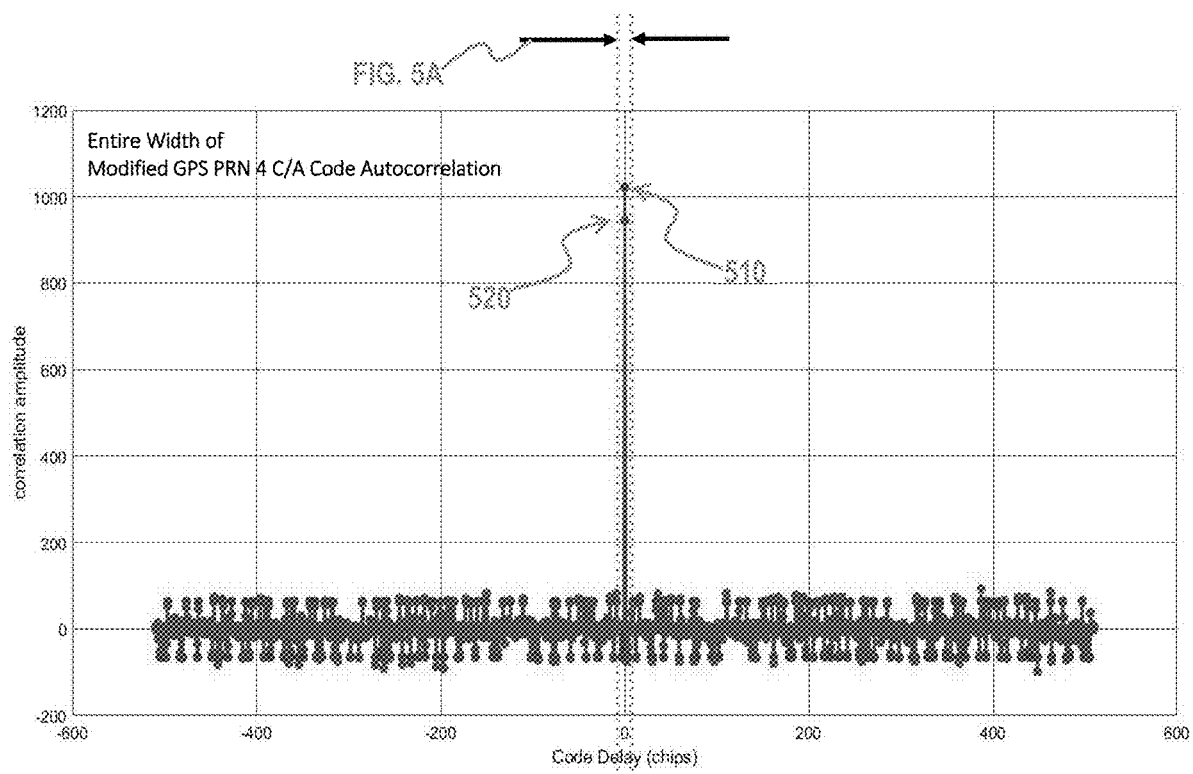
FIG. 5B illustrates an exemplary plot of correlation amplitude/code delay illustrating at a much broader code delay scale the received and modified GPS PRN 4 C/A code signal in FIG. 5A, according to an embodiment.

FIG. 5A illustrates an exemplary plot of correlation amplitude/code delay illustrating a received modified GPS PRN 4 C/A code signal, according to an embodiment, while FIG. 5B illustrates an exemplary plot of correlation amplitude/code delay illustrating at a much broader code delay scale the received and modified GPS PRN 4 C/A code signal in FIG. 5A, according to an embodiment. FIGS. 5A and 5B illustrate the same correlation amplitude/code delay plot/graph (at different scales) for an example of the code modification algorithm in FIG. 4 using the value of N=3, the GPS C/A PRN 4 code, and the criteria that the absolute value of each of $C_{-N}$ to C−1 must be less than two. Accordingly, the goal is to reduce any peaks for the early autocorrelations $C_{-3}$, $C_{-2}$, and $C_{-1}$ to be less than two while maintaining $C_0$ close to +1023.

In FIG. 5A, line 510 is the unmodified GPS C/A PRN 4 code where the values for $C_{-3}$, $C_{-2}$, $C_{-1}$, and $C_0$={0, −65, 0, +1023}. Because $C_{-2}$=−65, the $1^{st}$ bit of the modified GPS C/A PRN 4 code (encode) is flipped to decrease the −65 peak. In all, 32 bits need to be flipped to make $C_{-2}$=−1, because 32×264, which also results in driving down the main peak to $C_0$=959 (=1032−64), resulting in line 520 in FIG. 5A. This causes a signal to noise ratio (SNR) loss in the main peak of $20*\log_{10}(959/1023)\approx 0.56$ dB.

While the code delay scale in FIG. 5A is from −10 chips to +10 chips, the code delay scale for the same modified signal 520 and unmodified signal 510 is from −511 chips to +511 chips in FIG. 5B. FIG. 5B shows there are only minor differences between the original GPS C/A PRN 4 code and the modified GPS C/A PRN 4 code when considered as a whole.

Since, as shown in FIG. 1, it is the locally generated code A that is being modified, the code modification algorithm may also be presented as Equations (2)(a) and (2)(b):

If offset peak is negative and $B_n \neq A_{n-i}$, then flip $A_{n-i}$  (2)(a)

If offset peak is positive and $B_n = A_{n-i}$, then flip $A_{n-i}$  (2)(b)

Figure 6A:
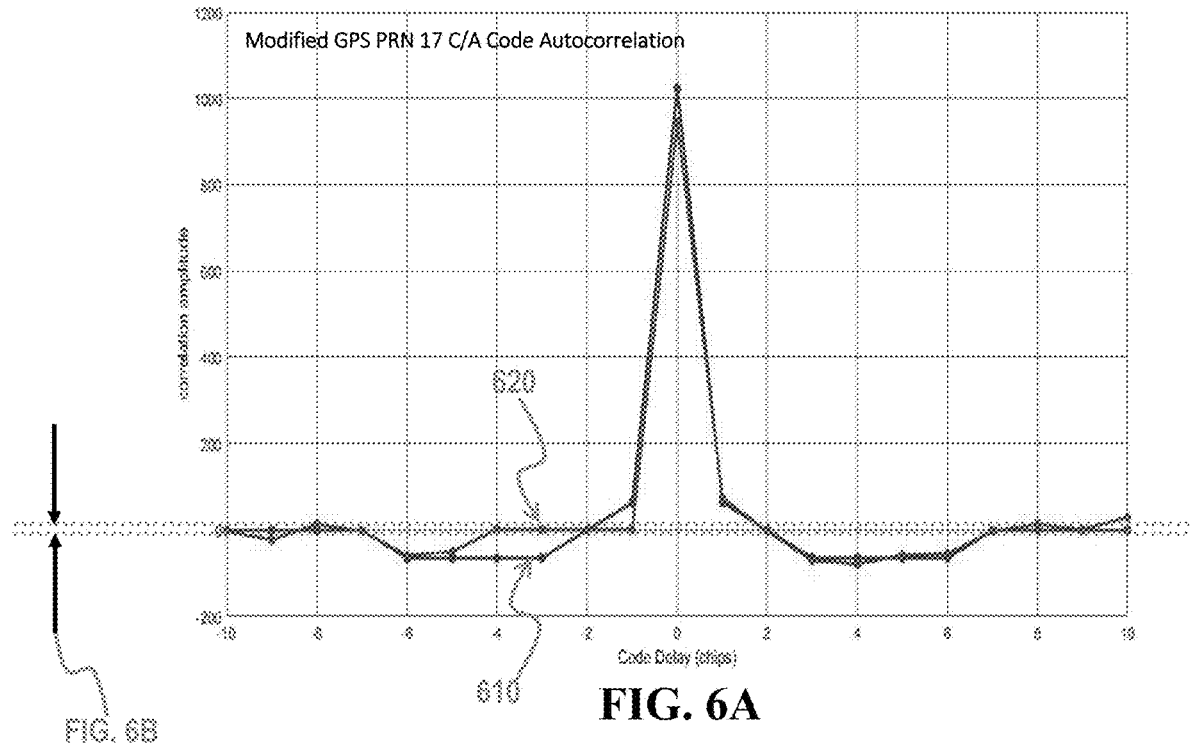
FIG. 6A illustrates an exemplary plot of correlation amplitude/code delay illustrating a received modified GPS PRN 17 C/A code signal, according to an embodiment.
Figure 6B:
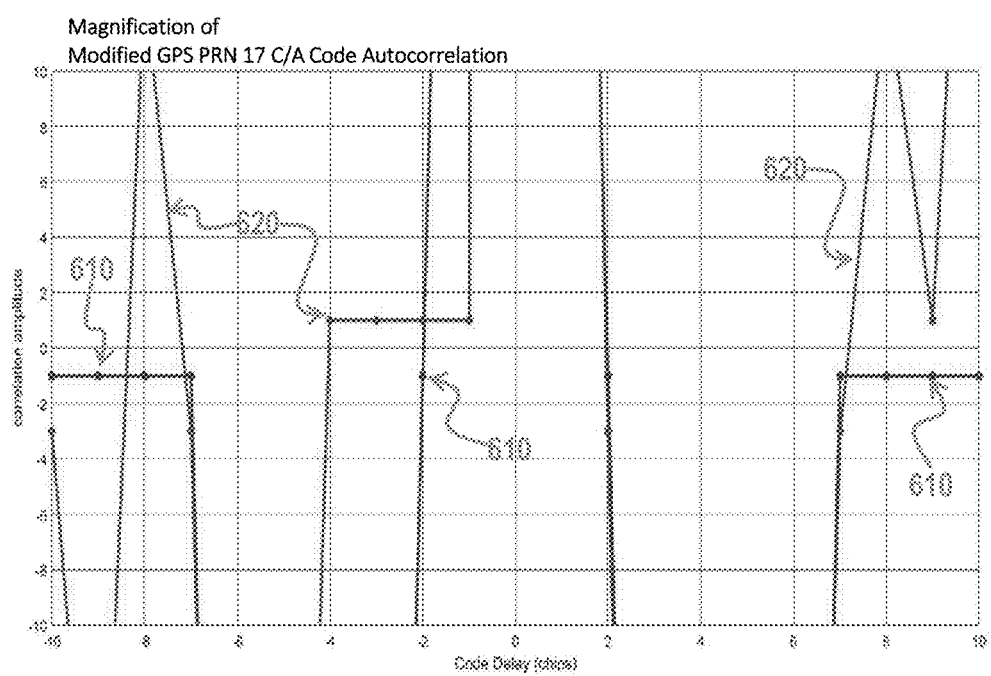
FIG. 6B illustrates an exemplary plot of correlation amplitude/code delay illustrating at a much smaller correlation amplitude scale the received and modified GPS PRN 17 C/A code signal in FIG. 6A, according to an embodiment.

FIG. 6A illustrates an exemplary plot of correlation amplitude/code delay illustrating a received modified GPS PRN 17 C/A code signal, according to an embodiment, while FIG. 6B illustrates an exemplary plot of correlation amplitude/code delay illustrating at a much smaller correlation amplitude scale the received and modified GPS PRN 17 C/A code signal in FIG. 6A, according to an embodiment. FIGS. 6A and 6B illustrate the same correlation amplitude/code delay plot/graph (at different scales) for an example of the code modification algorithm in FIG. 4 on the GPS C/A PRN 17 code. While the correlation amplitude scale in FIG. 6A is from −200 to +1200, the correlation amplitude scale for the same modified signal 620 and unmodified signal 610 is only from −10 to +10 in FIG. 6B. Autocorrelation has been reduced to $20*\log_{10}(1/959) \approx -60$ dB.

Figure 7A:
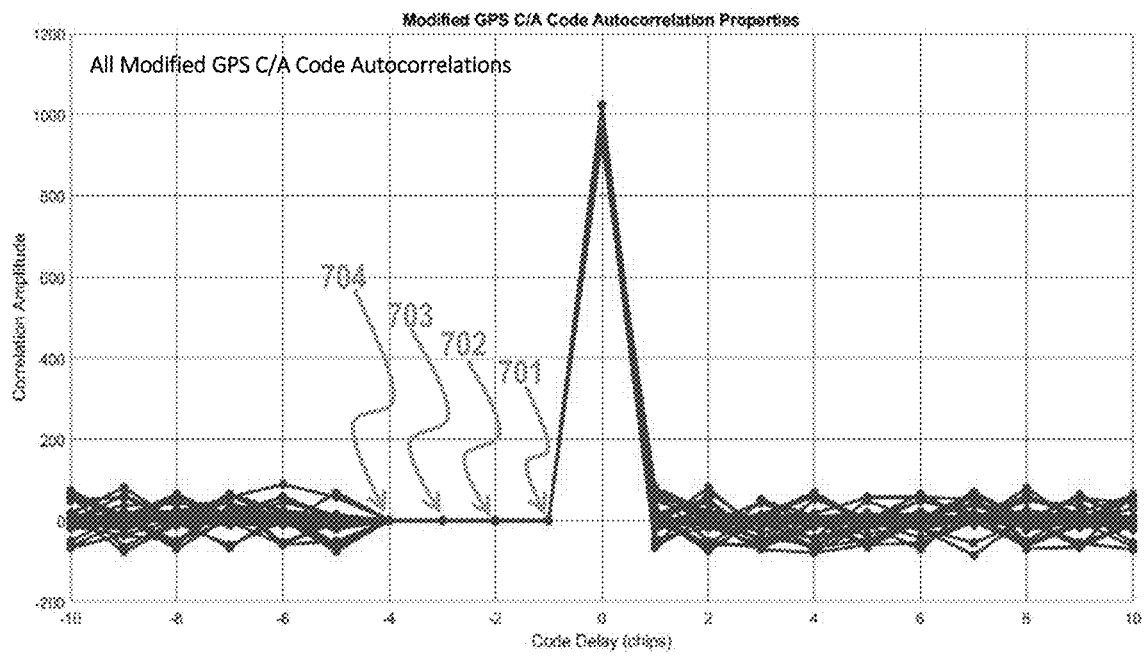
FIG. 7A illustrates an exemplary plot of correlation amplitude/code delay of the autocorrelations of all 37 modified GPS C/A PRN codes overlaid on top of each other, according to an embodiment.

FIG. 7A illustrates an exemplary plot of correlation amplitude/code delay of the autocorrelations of all 37 modified GPS C/A PRN codes overlaid on top of each other, according to an embodiment. As can be seen in FIG. 7A, the four earlier autocorrelations 704 ($C_{-4}$), 703 ($C_{-3}$), 702 ($C_{-2}$), and 701 ($C_{-1}$) for all of the modified GPS C/A codes have been minimized.

Figure 7B:
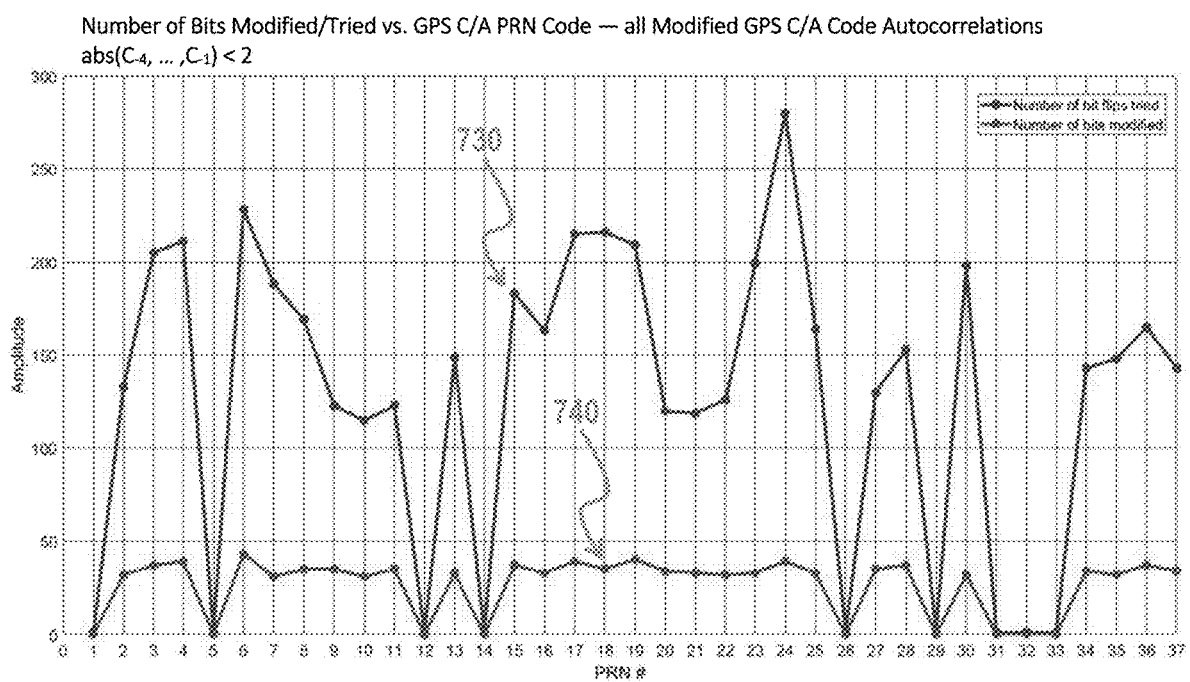
FIG. 7B illustrates an exemplary plot of the number of attempted hit flips and the number of bits actually flipped (i.e., modified) over all 37 C/A PRN codes, according to an embodiment.

FIG. 7B illustrates an exemplary plot of the number of attempted bit flips 730 and the number of bits actually flipped (i.e., modified) 740 over all 37 C/A PRN codes where the criteria is set as $abs(C_{-4}, \ldots, C_{-1}) < 2$, according to an embodiment.

Figure 8A:
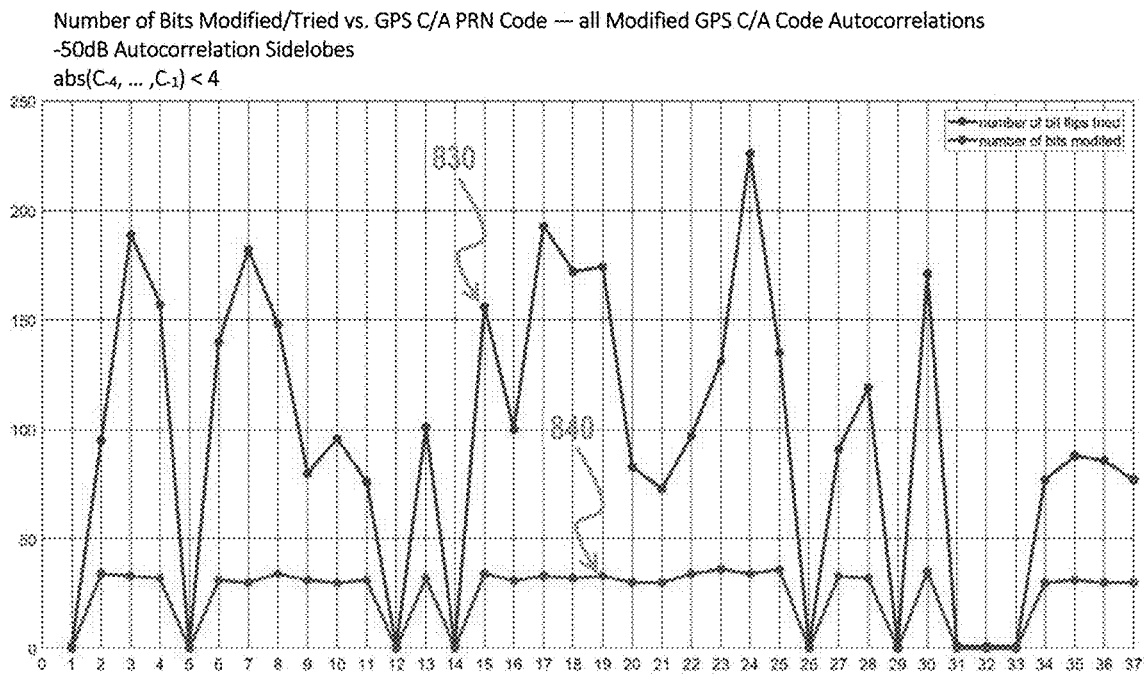
FIG. 8A illustrates an exemplary plot of the number of attempted bit flips and the number of bits actually flipped (i.e., modified) over all 37 C/A PRN codes with a different set criteria than FIG. 7B, according to an embodiment.

FIG. 8A illustrates an exemplary plot of the number of attempted bit flips 830 and the number of bits actually flipped (i.e., modified) 840 over all 37 C/A PRN codes where the criteria is $abs(C_{-4}, \ldots, C_{-1}) < 4$, according to an embodiment. Under such a criteria, the maximum interference autocorrelation is $20*\log_{10}(3/1023) = -50.7$ dB with relation to the correlated peak.

Figure 8B:
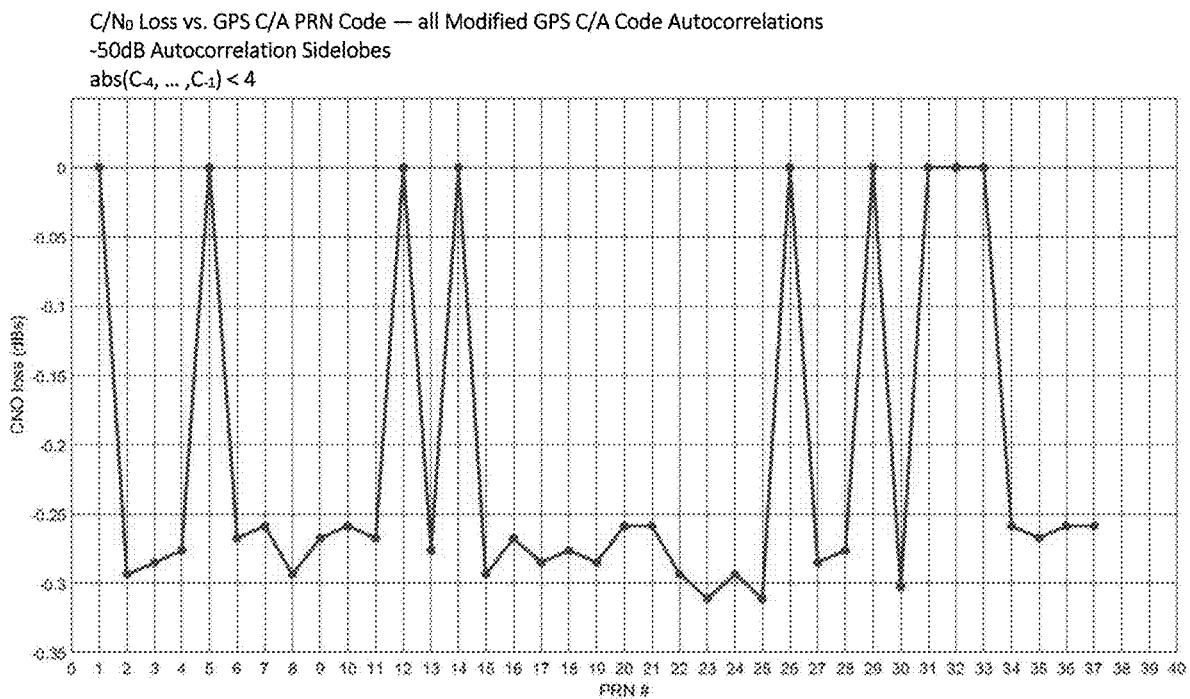
FIG. 8B illustrates an exemplary plot/graph of $C/N_0$ loss over all 37 C/A PRN codes with the same criteria as FIG. 8A, according to an embodiment.

FIG. 8B illustrates an exemplary plot/graph of $C/N_0$ loss (in dBs) over all 37 C/A PRN codes where the criteria is $abs(C_{-4}, \ldots, C_{-1}) < 4$ resulting in −50.7 dB autocorrelation sidelobes, according to an embodiment.

Figure 9A:
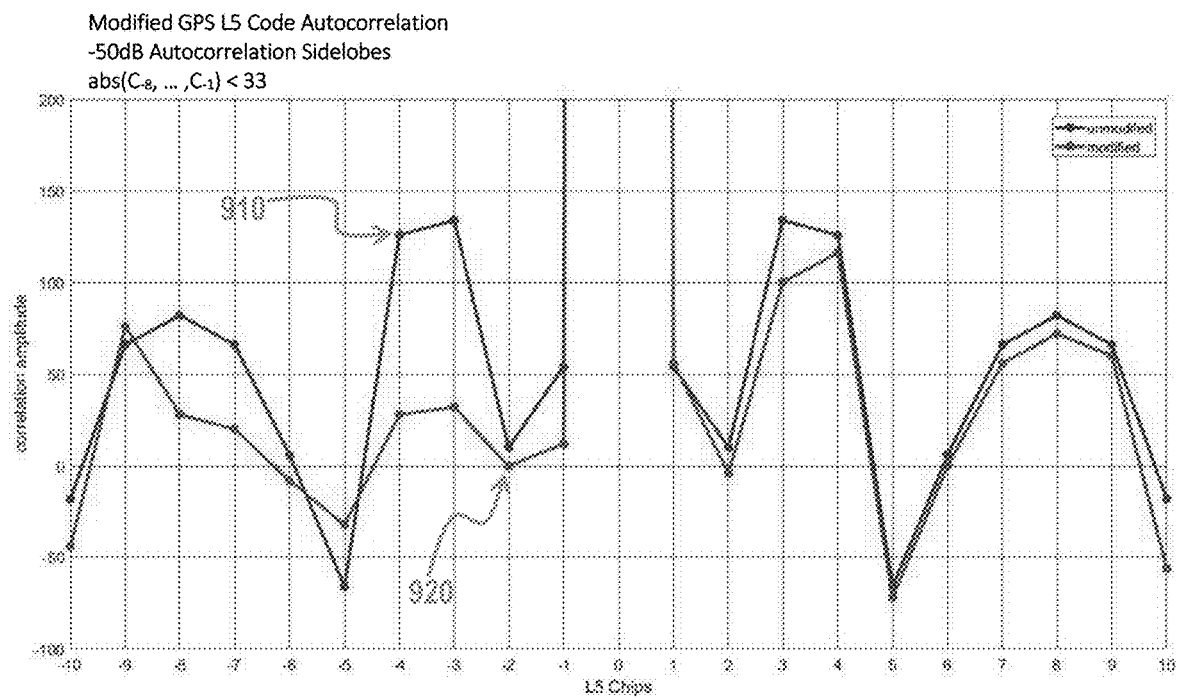
FIG. 9A illustrates an exemplary plot of correlation amplitude/code delay for an original GPS L5 PRN 1 code signal 910 and the modified GPS 5 PRN 1 code signal 920 with one criteria for the code modification algorithm, according to an embodiment.

FIG. 9A illustrates an exemplary correlation amplitude/code delay plot/graph for an original GPS L5 PRN 1 code signal 910 and the modified GPS L5 PRN 1 code signal 920 according to an embodiment where the criteria for the code modification algorithm is $abs(C_{-8}, \ldots, C_{-1}) < 33$. Under such a criteria, the maximum interference autocorrelation is $20*\log_{10}(32/10,230) = -50.1$ dB with relation to the correlated peak. In experiments/simulations, the number of bit flips tried were 1,368, while the number of bits actually flipped (i.e., modified) were 51 for the GPS L5 PRN 1 code under these conditions, while the $C/N_0$ loss was roughly 0.04 dB.

Figure 9B:
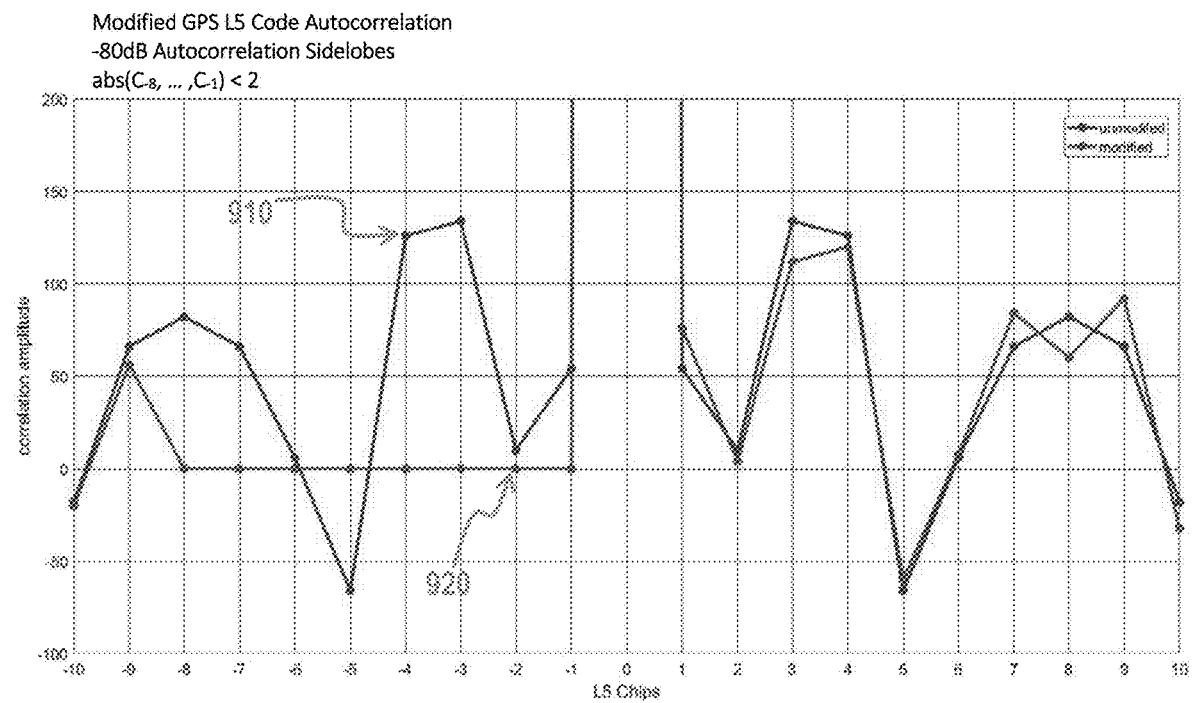
FIG. 9B illustrates an exemplary plot of correlation amplitude/code delay for an original GPS L5 PRN 1 code signal 910 and the modified GPS L5 PRN 1 code signal 920 with another criteria for the code modification algorithm, according to an embodiment.

FIG. 9B illustrates an exemplary correlation amplitude/code delay plot/graph for an original GPS L5 PRN 1 code signal 910 and the modified GPS L5 PRN 1 code signal 920 according to an embodiment where the criteria for the code modification algorithm is $abs(C_{-8}, \ldots, C_{-1}) < 2$. Under such a criteria, the maximum interference autocorrelation is $20*\log_{10}(1/10,230) = -80$ dB with relation to the correlated peak. In experiments/simulations, the number of bit flips tried were 4,816, while the number of bits actually flipped (i.e., modified) were 69 for the GPS L5 PRN 1 code under these conditions, while the $C/N_0$ loss was roughly 0.06 dB.

The appendices of the present disclosure provide examples in computer code of a code modification algorithm (APPENDIX I) and an individual criteria code for a GPS C/A code (APPENDIX II) according to an embodiment of the present disclosure. According to the embodiment in these appendices, each individual offset $C_{-i}$ is checked to see if flipping the current bit will improve its correlation. If it does, the criteria for this offset $C_{-i}$ is set to true. If all of the criteria for all desired $C_{-N}, \ldots, C_{-1}$ are set to true, then the overall criteria is met and the bit is flipped in the GPS C/A code. This process is continued until all $C_{-N}$ through $C_{-1}$ meet the desired autocorrelation sidelobe threshold (such as, e.g., $abs(C_{-4}, \ldots, C_{-1}) < 2$ or $abs(C_{-4}, \ldots, C_{-1}) < 4$ from the examples above).

Although the examples described above involved GPS code signals, embodiments of the present disclosure are not so limited, but rather may be applied to any GNSS code (e.g., Galileo E1, Beidou, etc.), with the appropriate modifications/adjustments, as would be understood by one of ordinary skill in the art. According to an embodiment, partial chip bit flipping may be used to drive offset peaks to zero for "odd" bit codes.

Using embodiments of the present disclosure, the code delay starting point ("k") may be selected at any point in the locally generated code to potentially provide better performance. As would be understood by one of ordinary skill in the art, simulations and/or experiments may be used to select the best parameters for implementing a code modification system, method, and/or apparatus for the specific environment and/or desired accuracy results. In general, the parameters will be primarily selected in order to minimize side/offset peaks and maximize the main peak.

According to an embodiment, the GNSS receiver may store both original/unmodified (i.e., IDC defined) and modified local codes and have a criteria for switching between the two, such as, for example, when substantial multipath propagation is detected. As another example, the original/unmodified codes could be used for signal acquisition, while modified codes could be used for wide code delay searches. Moreover, multiple modified local codes may be stored, based on the desired level of $C/N_0$ loss vs. autocorrelation sidelobe suppression performance.

As would be understood by one of ordinary skill in the art, the modified local codes may be stored/implemented in a wide variety of ways. For example, the modified codes may be implemented by maintaining a table of bits to be flipped, where the unmodified/standard code is used except for the specific bits identified in the table which are flipped to modify the code before correlation.

Embodiments of the present disclosure are capable of efficiently and relatively simply suppress autocorrelation sidelobes caused by multipath/NLOS signals of a single satellite. Embodiments of the present disclosure are particularly useful when using earliest arriving signal/peak algorithms in terms of detecting the true earliest arriving energy and forming range and rate measurements therefrom.

As mentioned above, the selection of N when implementing code modification according to an embodiment of the present disclosure is constrained by the number of bits in the code being modified (e.g., 1,023 for a GPS L1 C/A code vs. 10,230 for a GPS L5 code); however, practically speaking, N values are easily selected to maintain a certain threshold dB level and/or alleviate the most significant multipath effects, which usually occur within 500 meters or so.

Figure 10:
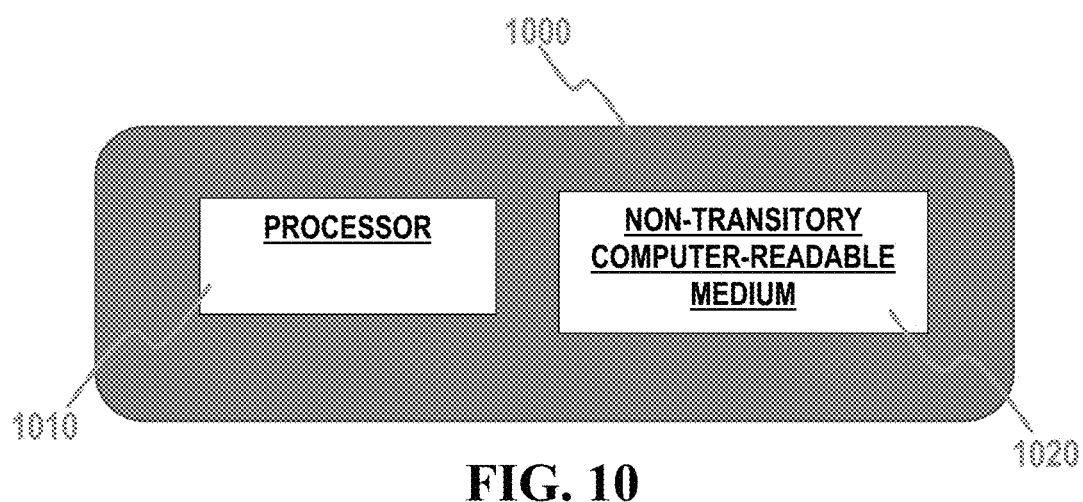
FIG. 10 illustrates an exemplary diagram of the present apparatus, according to an embodiment.

FIG. 10 illustrates an exemplary diagram of the present apparatus, according to one embodiment. An apparatus 1000 includes at least one processor 1010 and one or more non-transitory computer readable media 1020. The at least one processor 1010, when executing instructions stored on the one or more non-transitory computer readable media 1020, performs the steps of modifying one or more bits of a locally generated code used according to a threshold criteria for autocorrelation offset peaks; and correlating a corresponding satellite generated code in a received GNSS signal using the modified locally generated code.

Moreover, the one or more non-transitory computer-readable media 1020 stores instructions for the at least one processor 1010 to perform those steps.

The steps and/or operations described above in relation to an embodiment may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software. More specifically, depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

A "processor" as used herein refers to any device configured to perform one or more operations based on instructions, including, but not limited to, any general purpose processor in communication with a storage medium from which computer-readable instructions can be retrieved, any special-purpose processor configured to execute specific types of instructions (such as a Digital Signal Processor or DSP), any special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement an embodiment of the present disclosure may be symmetric or asymmetric. A processor as used herein may include, without limitation, one or more ASICs, standard integrated circuits, controllers executing appropriate instructions, and including microcontrollers and/or embedded controllers, FPGAs, CPLDs, microprocessors, and the like.

The term "non-transitory computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, EEPROM, any other memory chip or cartridge, or any other medium on which instructions which can be executed by a processor are stored.

Thus, methods according to embodiments of the present disclosure may be implemented by devices constructed to perform the operations (such as hardware circuits), or implemented as programs and/or higher-level instructions to be provided to one or more processors for performance/implementation (such as instructions stored in a non-transitory memory), and/or that includes machine-level instructions stored in, e.g., firmware or non-volatile memory. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Accordingly, embodiments of the present disclosure may be implemented in a wide variety of computing architectures and environments, as would be understood by one of ordinary skill in the art. One or more logical operations of embodiments of the present disclosure may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present disclosure may also perform other functions, steps, and operations neither considered nor discussed herein (e.g., the one or more processors being multi-functional and/or capable of multi-tasking).

Depending on the embodiment of the present disclosure, some or all of the steps and/or operations may be implemented or otherwise performed, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet, computers, portable digital assistants (PDAs), mp3 players, handheld PCs, instant messaging devices (IMD), cellular telephones, global navigational satellite system (GNSS) receivers, watches, or any such device which can be worn and/or carried on one's person.

While certain embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

APPENDIX I

EXAMPLE OF GPS C/A CODE MODIFICATION ALGORITHM CODE

```
%%%%%%%%%%%%%%%%%%%%%%%%%%%%%%%%%%%
% Create oversampled C/A cixi8,                       %
%%%%%%%%%%%%%%%%%%%%%%%%%%%%%%%%%%%
ca_code = create_gps_ca_code( 17, 1023 );
shifted_ca_code = circshift( ca_code, −10 );
%%%%%%%%%%%%%%%%%%%%%%%%%%%%%
% Compute correlations.                    %
%%%%%%%%%%%%%%%%%%%%%%%%%%%%%
correlation_fx_before(1, :) = ifft( fft(ca_code) .* conj(fft(shifted_ca_code)) );
%%%%%%%%%%%%%%%%
% Optimize.           %
%%%%%%%%%%%%%%%%
% Take copy of shifted C/A code.
m_ca_code = circshift( shifted_ca_code, −10 );
exit_threshold = 2;
modified_count = 0;
for k = 1:500
    correlation_fx_test = ifft( fft(shifted_ca_code) .* conj(fft(m_ca_code)) );
    if( (abs(correlation_fx_test(10)) < exit_threshold) && (abs(correlation_fx_test(9))
```

APPENDIX I-continued

EXAMPLE OF GPS C/A CODE MODIFICATION ALGORITHM CODE

```
< exit_threshold) && (abs(correlation_fx_test(8)) < exit_threshold) &&
(abs(correlation_fx_test(7)) < exit_threshold) )
    success = k
    modified_count
    correlation_fx_test(11)
    break;
end
% Perform algorithm on C-n values.
    Cm1 = criteria_operation( shifted_ca_code(k+9), m_ca_code(k),
correlation_fx_test(10) );
    Cm2 = criteria_operation( shifted_ca_code(k+8), m_ca_code(k),
correlation_fx_test(9) );
    Cm3 = criteria_operation( shifted_ca_code(k+7), m_ca_code(k),
correlation_fx_test(8) );
    Cm4 = criteria_operation( shifted_ca_code(k+6), m_ca_code(k),
correlation_fx_test(7) );
    if ( (Cm1 == true) && (Cm2 == true) && (Cm3 == true) && (Cm4 == true) )
        m_ca_code(k) = -m_ca_code(k);    % Flip the modified code bit.
        modified_count = modified_count + 1;
    end % if
end % for k = 1:100
correlation_fx_after = ifft( fft(shifted_ca_code) .* conj(fft(m_ca_code)) );
```

APPENDIX II

EXAMPLE OF INDIVIDUAL CRITERIA CODE

```
function ( criteria ) = criteria_operation( shifted_ca_code_bit,
m_ca_code_bit, correlation_value )
%%%%%%%%%%%%%%%%%%%%%%%%%%%%%%%%%%%%
% Create C/A code for av_pro.                                   %
%%%%%%%%%%%%%%%%%%%%%%%%%%%%%%%%%%%%
criteria = false;
if( abs(correlation_value) < 2 )  % if value already +/-1 then set true,
can't do any better.
    criteria = true;
else
    if( correlation_value < -1 )   % If need to make correlation more
positive.
        if( shifted_ca_code_bit, -= m_ca_code_bit )
            criteria = true;
        end
    else
        if( correlation_value > 1 )   % If need to make correlation more
negative.
            if( shifted_ca_code_bit == m_ca_code_bit )
                criteria = true;
            end
        end % if( correlation_value > 1 )
    end % if( correlation_value > -1 )
end % if( abs( correlation_value < 2 ) )
end % function criteris_operation
```

What is claimed is:

1. A method for a global navigation satellite system (GNSS) receiver, comprising:
 modifying one or more bits of a locally generated code used according to a threshold criteria for autocorrelation offset peaks, wherein the threshold criteria includes keeping autocorrelation values under a threshold value; and
 correlating a corresponding satellite generated code in a received GNSS signal using the modified locally generated code until each of the autocorrelation values meet the threshold criteria for the same modified locally generated code.

2. The method of claim 1, further comprising:
 performing autocorrelation from which the autocorrelation offset peaks are derived.

3. The method of claim 1, wherein correlating a corresponding satellite generated code in a received GNSS signal using the modified locally generated code comprises:
 creating one modified locally generated code per satellite by simultaneously optimizing multiple chip chips within the satellite's code.

4. The method of claim 1, wherein modifying one or more bits of the locally generated code comprises:
 storing a table indicating which bits of the locally generated code to modify.

5. The method of claim 1, further comprising:
 selecting whether to use the locally generated code or the modified locally generated code for correlation based on a selection criteria.

6. The method of claim 5, wherein the selection criteria is based on a performance characteristic.

7. The method of claim 1, wherein modifying one or more bits of the locally generated code comprises:
 flipping a value of the one or more bits.

8. The method of claim 1, wherein the threshold criteria for autocorrelation offset peaks comprises keeping autocorrelation values $C_{-N}, \ldots, C_{-1}$ under the threshold value, wherein N is an integer value less than half the total number of bits comprising the locally generated code.

9. The method of claim 1, wherein the received GNSS signal is at least one of a global positioning system (GPS) L1 C/A code signal, a GPS L1 C code signal, and a GPS L5 code signal.

10. The method of claim 1, wherein the received GNSS signal is at least one of a global positioning system (GPS) code signal, a GLONASS code signal, a BeiDou code signal, and a Galileo code signal.

11. A global navigation satellite system (GNSS) receiver, comprising:
 a plurality of satellite code signal generators which are capable of generating a modified local code, wherein the generated modified local code comprises a locally generated code with one or more bits modified according to a threshold criteria for autocorrelation offset peaks, and wherein the threshold criteria includes keeping autocorrelation values under a threshold value; and
 a plurality of correlators which receive the generated modified local code and use the generated modified local code to correlate a corresponding satellite generated code in a received GNSS signal until each of the autocorrelation values meet the threshold criteria for the same modified locally generated code.

12. The GNSS receiver of claim 11, wherein the GNSS receiver performs autocorrelation from which the autocorrelation offset peaks are derived.

13. The GNSS receiver of claim 11, wherein the GNSS receiver creates one modified locally generated code per satellite by simultaneously optimizing multiple chip chips within the satellite's code.

14. The GNSS receiver of claim 11, further comprising:
a storage comprising a memory including the generated modified local code.

15. The GNSS receiver of claim 14, wherein the storage comprises a table indicating which bits of a locally generated code to modify to generate the generated modified local code.

16. The GNSS receiver of claim 11, wherein either the generated modified local code or a corresponding locally generated code is used for correlation based on a selection criteria.

17. The GNSS receiver of claim 16, wherein the selection criteria is based on a performance characteristic.

18. The GNSS receiver of claim 11, wherein the generated modified local code comprises a corresponding locally generated code with one or more bits flipped.

19. The GNSS receiver of claim 11, wherein the threshold criteria for autocorrelation offset peaks comprises keeping autocorrelation values $C_{-N}, \ldots, C_{-1}$ under the threshold value, wherein N is an integer value less than half the total number of bits comprising the locally generated code.

20. An apparatus, comprising:
one or more non-transitory computer-readable media; and
at least one processor which, when executing instructions stored on one or more non-transitory computer readable media, performs the steps of:
modifying one or more bits of a locally generated code used according to a threshold criteria for autocorrelation offset peaks, wherein the threshold criteria includes keeping autocorrelation values under a threshold value; and
correlating a corresponding satellite generated code in a received GNSS signal using the modified locally generated code until each of the autocorrelation values meet the threshold criteria for the same modified locally generated code.

* * * * *